P. X. JOHNSON.
FISH TRAP.
APPLICATION FILED AUG. 30, 1916.
1,292,794.
Patented Jan. 28, 1919.
2 SHEETS—SHEET 2.
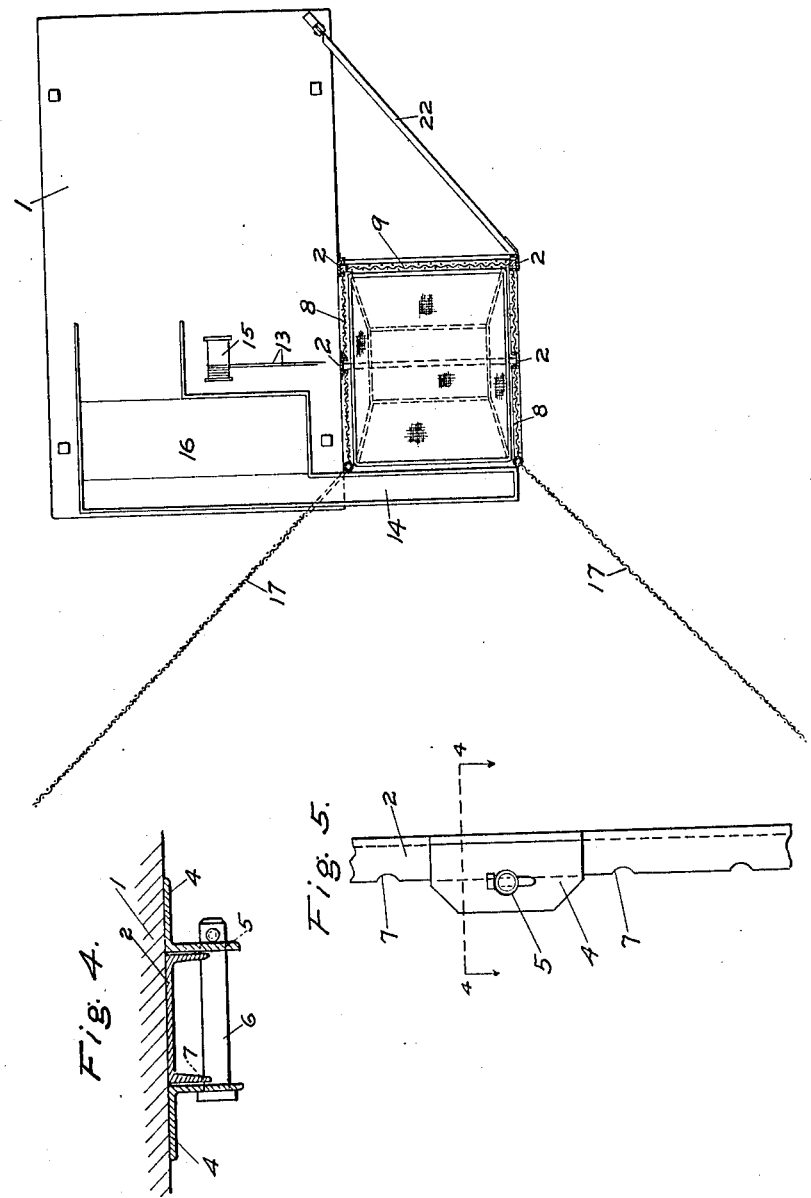

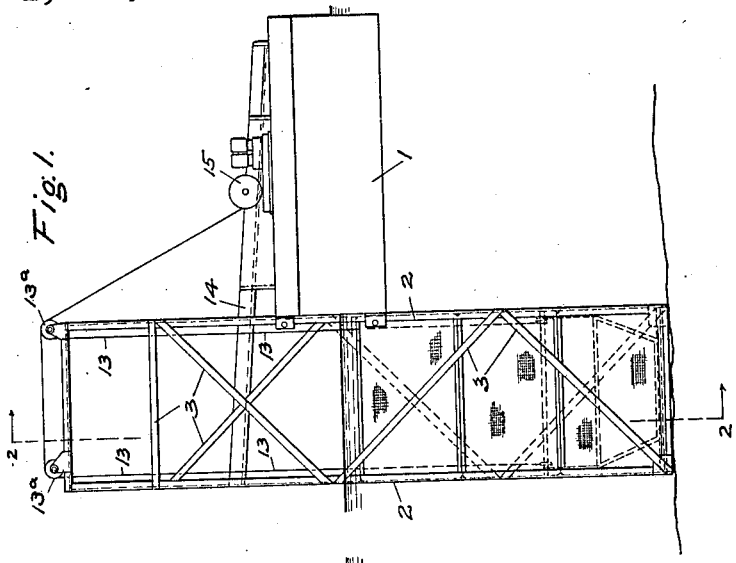
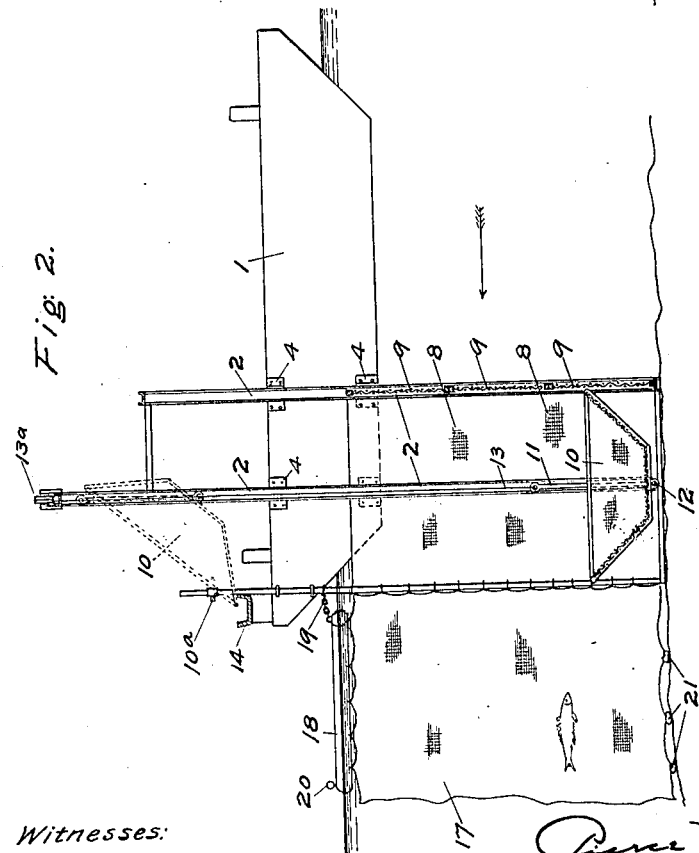

UNITED STATES PATENT OFFICE.

PIERCE X. JOHNSON, OF PORTLAND, OREGON, ASSIGNOR OF ONE-FOURTH TO ADOLF H. EILERS AND ONE-FOURTH TO MAX C. KOESTER, BOTH OF PORTLAND, OREGON.

FISH-TRAP.

1,292,794.	Specification of Letters Patent.	Patented Jan. 28, 1919.

Application filed August 30, 1916. Serial No. 117,700.

*To all whom it may concern:*

Be it known that I, PIERCE X. JOHNSON, a citizen of the United States, residing in the city of Portland, county of Multnomah, and State of Oregon, have invented certain new and useful Improvements in Fish-Traps, of which the following is a specification.

My invention relates to fish traps, and more particularly to a fish trap designed to be used in connection with a scow, or other suitable floating support, and it has among its salient objects to provide in combination with a floating support, a trap frame open in front and capable of being raised and lowered relative to its floating support, whereby to be extended down a considerable distance into the water, if not to the bottom of the stream; to provide in connection therewith an elevator basket with means for raising and lowering the same from the bottom of said frame for the purpose of dipping up the fish within the trap; to provide in combination therewith means for automatically dumping the basket and for discharging the fish into the body of the scow, or boat; to provide in combination therewith spreading wings of suitable woven material, with supporting booms from which said wings are suspended, said wings being capable of being spread to different angles, or to be folded together; and, in general, to provide a floating fish trap having a trap-frame capable of being extended down into the water to any desirable depth, and having spreading wings capable of being spread across the stream, or opened out to cover a considerable area as said trap is moved forwardly; and, to provide such a fish trap which shall be practical and comparatively inexpensive to construct and operate.

In order that others may understand my invention, I have illustrated in a general way one practical embodiment thereof, which I will now describe.

Figure 1 is a rear view of one embodiment of my invention;

Fig. 2 is a side view thereof;

Fig. 3 is a top plan view thereof;

Fig. 4 is an enlarged detail view, showing a sliding connection of the fish-trap frame, with the side of the scow or float; and Fig. 5 is a fragmentary side or edge view thereof.

Referring now more in detail to the drawings, my invention comprises in combination a scow, or other suitable floating support, designated 1. It will be understood, of course, that this may be of any desired construction, and may be made more or less elaborate, as desired, and suitably equipped with power mechanism.

Mounted at one side of said scow, in a manner to be raised and lowered vertically, is a fish-trap frame made of channel irons 2—2, connected by means of suitable braces 3—3, whereby said frame constitutes a frame similar to an elevator shaft, but open at its forward side and slidably connected to the side of the scow by means of angle brackets 4—4, shown in enlarged detail view in Fig. 4, said angle brackets being provided in their outwardly projecting angles with pin holes 5, adapted to receive the supporting pins 6. The channel iron frame members 2—2, which move through the brackets 4—4, are provided in their edges with semi-circular bolt recesses 7—7, whereby to hold said fish-trap frame in its different positions of vertical adjustment. Any suitable means may be provided for raising and lowering said frame. The sides of said fish-trap frame are covered with suitable woven material, as at 8—8, and the rear side thereof is provided with a series of gates, as 9—9, made of similar woven material, adapted to be dropped into the opposite channel irons 2—2, at the rear corners of the frame, in a manner which will be understood from Figs. 2 and 3. These gates are separate, and any desired number may be placed in the frame, depending upon the depth to which said frame is extended down into the water, thus constituting a back wall to the trap frame against which the fish swim as they enter the open front of the trap.

A basket 10, provided with bail members 11—11, pivotally connected at the opposite sides of said basket, at its bottom, as at 12, is mounted in said trap-frame, to which bail members are attached two lifting cables 13—13, at the opposite sides of the frame, said cables running over sheaves, or pulleys 13ª—13ª, at the upper end of said frame, and thence to any suitable hoisting, or windlass, mechanism, as at 15, whereby said basket can be raised and lowered, elevator-fashion, within said frame. As said basket is raised to the top of said frame, it engages a stop 10ª, and is automatically tilted into the position shown in dotted lines, Fig. 2, whereby the fish picked up are discharged into an inclined trough-like structure 14, which extends across the front of the scow and discharges at one side into the open top 16, down into the body of the scow.

Attached to the front edges of the opposite sides of said fish-trap frame, are wing nets 17—17, suspended at their upper edges to floating booms, as 18, said floating booms being also attached at their inner ends, as at 19, to the scow, and at their outer ends being adapted to have attached thereto, as at 20, any suitable means for anchoring the outer ends of said booms, at any desired angle. Suitable weights 21, are attached to the lower edges of said wings 17—17. Any desired number of brace members, as 22, may be provided, and as may be necessary to rigidly support the fish-trap frame to the scow 1. It will also be understood that any desired means for propelling said scow, or boat, may be used, but as it forms no part of my invention I have not shown it on the drawings. Thus it will be seen that when the trap-frame is set down a considerable distance in the water, and when the wings 17—17, are spread, in the manner indicated in Fig. 3, if said device is anchored in a stream, all of the fish passing up the stream within the area taken in by the spreading wings, no matter to what depth, will be directed into the trap frame, and as the basket elevator is lifted it will pick up the fish thus corralled in the trap.

I am aware that many changes can be made in the device as here shown for purposes of illustration, without departing from the spirit thereof, and I do not, therefore, limit the invention to the exact showing here made, except as I may be limited by the hereto appended claims.

I claim:

1. In combination, a floating structure, a vertical structure vertically adjustable in said floating structure extending below the same and having one side open, spreading side wings extending from the opposite sides of the open side of said structure for directing fish into said vertical structure, and an elevator basket with means for moving the same up and down in said vertical structure, whereby to dip up fish entering the open side of said vertical structure, substantially as described.

2. In combination, a floating structure, a vertical structure adjustably attached thereto and adapted to be moved down into the water below the bottom of said floating structure and having one side open, spreading side wings extending from the opposite sides of the open side of said structure for directing fish into said vertical structure, and an elevator basket with means for moving the same up and down in said vertical structure, whereby to dip up fish entering the open side of said vertical structure.

3. In a device of the character referred to, a vertically disposed cage-like structure having an open front and having its back wall formed of a plurality of removable gates, or screen sections, and elevating means within said cage-structure with means for raising and lowering the same to dip up the fish therein.

Signed at Portland, Multonomah county, Oregon, this 25th day of August, 1916.

PIERCE X. JOHNSON.

In presence of—
  I. M. GRIFFIN,
  J. C. STRENG.

Copies of this patent may be obtained for five cents each, by addressing the "Commissioner of Patents, Washington, D. C."